United States Patent
Jung et al.

(10) Patent No.: US 9,709,858 B2
(45) Date of Patent: Jul. 18, 2017

(54) LIQUID CRYSTAL DISPLAY

(71) Applicant: Samsung Display Co., Ltd., Yongin, Gyeonggi-Do (KR)

(72) Inventors: Hyung Gi Jung, Cheonan-si (KR); Swae-Hyun Kim, Asan-si (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 108 days.

(21) Appl. No.: 14/600,291

(22) Filed: Jan. 20, 2015

(65) Prior Publication Data

US 2016/0011469 A1    Jan. 14, 2016

(30) Foreign Application Priority Data

Jul. 9, 2014 (KR) ........................ 10-2014-0086238

(51) Int. Cl.
| | | |
|---|---|---|
| *G02F 1/1343* | (2006.01) | |
| *G02F 1/1333* | (2006.01) | |
| *G02F 1/1362* | (2006.01) | |

(52) U.S. Cl.
CPC .... *G02F 1/134309* (2013.01); *G02F 1/13624* (2013.01); *G02F 1/133345* (2013.01); *G02F 2001/134345* (2013.01)

(58) Field of Classification Search
CPC ... G02F 2001/134345; G02F 1/133345; G02F 1/13624
See application file for complete search history.

(56) References Cited

U.S. PATENT DOCUMENTS

| | | |
|---|---|---|
| 8,035,787 B2 | 10/2011 | Jung et al. |
| 8,134,670 B2 | 3/2012 | Jung et al. |
| 8,456,599 B2 | 6/2013 | Jeong et al. |
| 2009/0015776 A1 | 1/2009 | Lyu |
| 2011/0157537 A1* | 6/2011 | Chen ................. G02F 1/133707 349/158 |

(Continued)

FOREIGN PATENT DOCUMENTS

| | | |
|---|---|---|
| JP | 2010-169814 A | 5/2010 |
| KR | 10-2012-0074967 A | 7/2012 |
| KR | 10-2012-0104720 A | 9/2012 |

*Primary Examiner* — Paul Lee
*Assistant Examiner* — Jia Pan
(74) *Attorney, Agent, or Firm* — Robert E. Bushnell, Esq.

(57) ABSTRACT

A liquid crystal display (LCD) including: a first substrate; a first subpixel electrode applied with a voltage; a second subpixel electrode applied with another voltage; an insulating layer between the first and second subpixel electrodes; a second substrate; and a common electrode positioned on the second substrate. The first subpixel electrode includes a first subregion under the insulating layer and a second subregion thereon, the first and second subregions are coupled to each other through a contact bole formed in the insulating layer, the second subpixel electrode is positioned on the insulating layer, the first subregion of the first subpixel electrode and a third subregion of the second subpixel electrode overlap, and the first subregion of the first subpixel electrode is formed with concave portions at edges of left and right lateral sides of a planar shape including a cross-shaped connecting portion at its center and four trapezoids enclosing the cross-shaped connecting portion.

12 Claims, 16 Drawing Sheets

(56) References Cited

U.S. PATENT DOCUMENTS

| | | | |
|---|---|---|---|
| 2011/0170027 A1* | 7/2011 | Nakanishi | G02F 1/133707 349/33 |
| 2012/0224128 A1 | 9/2012 | Jung et al. | |
| 2013/0057813 A1 | 3/2013 | Jeong et al. | |
| 2013/0229609 A1 | 9/2013 | Jeong et al. | |
| 2014/0211142 A1* | 7/2014 | Kim | G02F 1/133707 349/138 |
| 2014/0267962 A1* | 9/2014 | Jung | G02F 1/134363 349/33 |

* cited by examiner

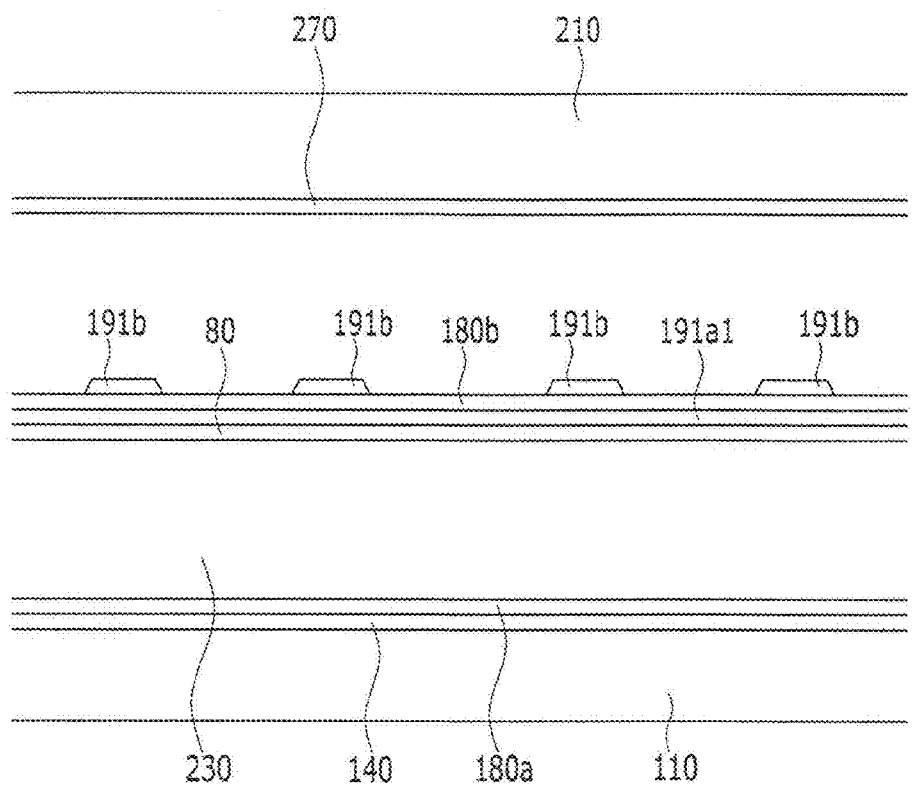

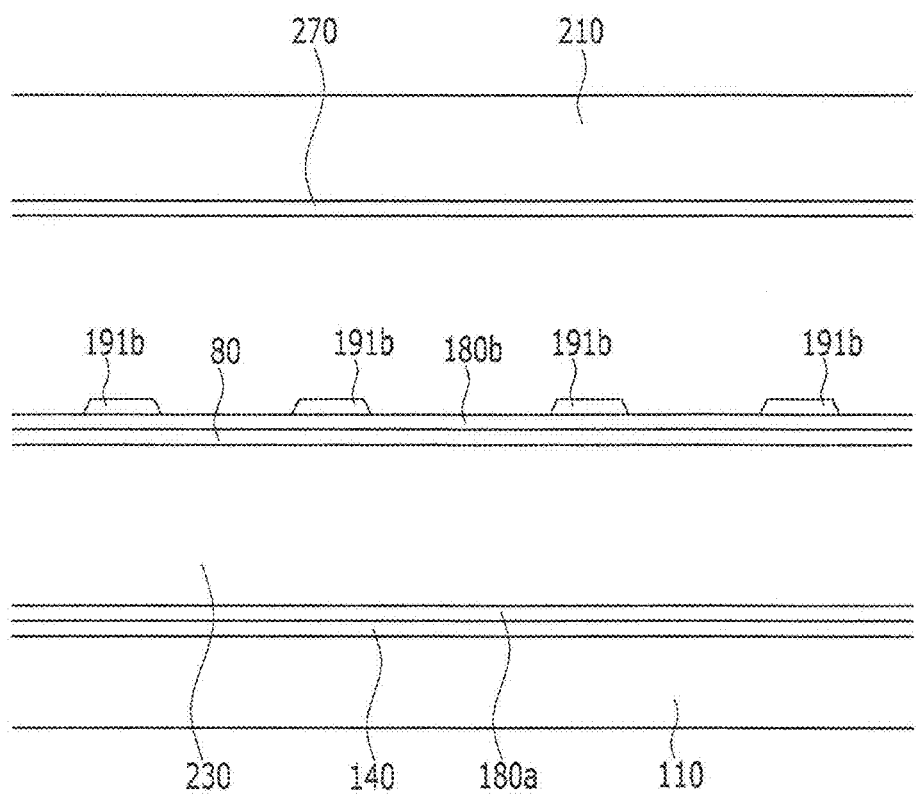

FIG. 14
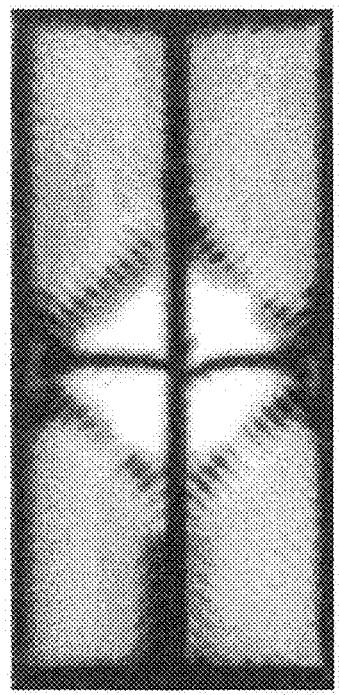

FIG. 15
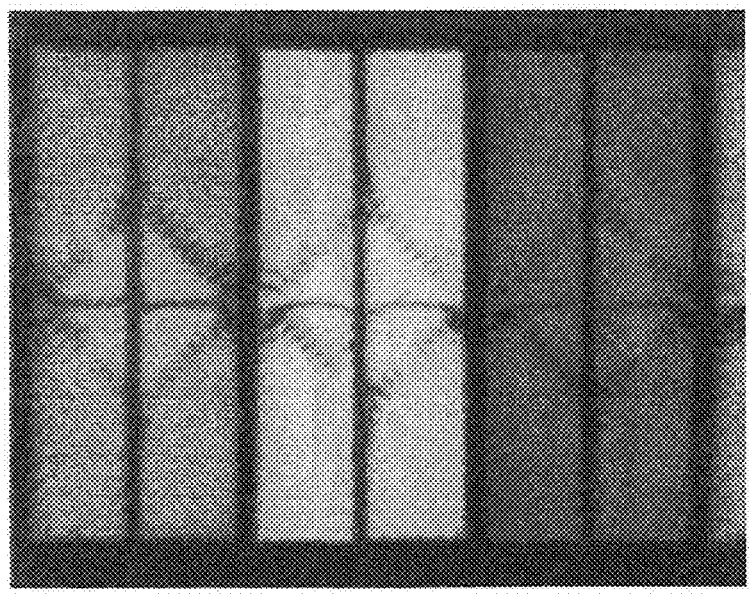
(a)
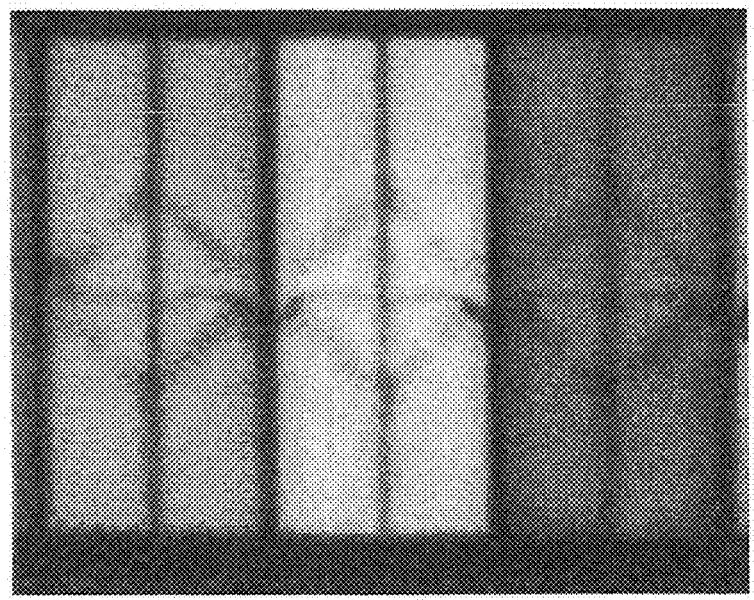
(b)

LIQUID CRYSTAL DISPLAY

CLAIM OF PRIORITY

This application makes reference to, incorporates the same herein, and claims all benefits accruing under 35 U.S.C §119 from an application entitled LIQUID CRYSTAL DISPLAY earlier filed in the Korean Intellectual Property Office on 9 Jul. 2014, and there duly assigned Serial No. 10-2014-0086238 by that Office.

BACKGROUND OF THE INVENTION

Field of the Invention

The present invention relates to a liquid crystal display.

Description of the Related Art

As one of the most widely used flat panel displays at present, a liquid crystal display (LCD) includes two display panels on which field generating electrodes such as a pixel electrode and a common electrode are formed, and a liquid crystal layer interposed between the two display panels. The LCD displays an image by generating an electric field on a liquid crystal layer by applying a voltage to the field generating electrodes, determining alignment directions of liquid crystal molecules of the liquid crystal layer by the generated field, and controlling polarization of incident light.

The LCD includes switching elements (e.g., thin film transistors) coupled to each pixel electrode, and a plurality of signal lines such as gate and data lines that control the switching elements to apply a voltage to the pixel electrode.

Among the LCDs, a vertically aligned mode LCD, in which liquid crystal molecules are aligned so that their long axes are perpendicular to the upper and lower panels while no electric field is applied, has been in the limelight because its contrast ratio is high and a wide reference viewing angle is easily implemented.

Herein, the reference viewing angle refers to a viewing angle at which a contrast ratio is 1:10 or a luminance inversion limit angle between grays.

For such a mode LCD, in order to make side visibility close to front visibility, a method has been proposed in which one pixel is divided into two subpixels having different transmittance by applying different voltages to the two subpixels.

However, when the side visibility becomes similar to the front visibility by dividing one pixel into two subpixels having different transmittance, luminance is increased at a low grayscale or a high grayscale and thus gray expression at the lateral sides is difficult, thereby deteriorating picture quality.

In addition, when one pixel is divided into two subpixels, transmittance decreases because of an interval between the two subpixels.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a liquid crystal display that is capable of making side visibility similar to front visibility and preventing transmittance from decreasing while improving texture occurrence at pixels.

An exemplary embodiment of the present invention provides a liquid crystal display including: a first, substrate; a first subpixel electrode positioned on the first substrate and applied with a first voltage; a second subpixel electrode positioned on the first substrate and applied with a second voltage; an insulating layer between the first and second subpixel electrodes: a second substrate facing the first substrate; and a common electrode positioned on the second substrate. The first subpixel electrode includes a first subregion under the insulating layer and a second subregion thereon, the first and second subregions are coupled to each other through a contact hole formed in the insulating layer, the second subpixel electrode is positioned on the insulating layer, the first subregion of the first subpixel electrode and a third subregion of the second subpixel electrode overlap each other while interposing the insulating layer therebetween, and the first subregion of the first subpixel electrode is formed with concave portions at edges of left and right lateral sides of a planar shape including a cross-shaped connecting portion at its center and four trapezoids enclosing the cross-shaped connecting portion.

A single pixel area may include: a first region where the first subregion of the first subpixel electrode overlaps the second subregion; a second region where the first subregion of the first subpixel electrode and a third subregion of the second subpixel electrode overlap each other; and a third region where a fourth subregion of the second subpixel electrode is positioned.

A difference between the first voltage and a common voltage may be greater than that between the second voltage and the common voltage.

The second subregion of the first subpixel electrode may not overlap the second subpixel electrode, and the second subregion of the first subpixel electrode may include a plurality of first branch electrodes that extend along respective different directions.

The second subregion of the first subpixel electrode may be positioned at a center of the pixel area in the shape of a rhombus.

The second subpixel electrode may include a plurality of second branch electrodes that extend along respective different directions.

One or more concave portions may be symmetrically formed at respective edges of left and right lateral sides of the first subregion of the first subpixel electrode.

The concave portions may be formed by one or more selected from triangular, quadrangular, semicircular, parallelogramic, and trapezoidal shapes.

A size of the second region may be about twice the size of the first region, and a size of the third region may be about twice the size of the second region.

End portions of the second branch electrode directed toward the first region from the second subpixel electrode may be formed to have a tapered tip shape at a border section between the first region and the second region.

End portions of the first branch electrode directed toward the second region from the second subregion of the first subpixel electrode may be bluntly formed.

The border section between the first region and the second region may have a gap that exceeds a predetermined width, and a width of the border section may be formed between 1 µm and 3 µm.

Another exemplary embodiment of the present invention provides a liquid crystal display including: a first substrate; a first subpixel electrode positioned on the first substrate and applied with a first voltage; a second subpixel electrode positioned on the first substrate and applied with a second voltage; an insulating layer between the first and second subpixel electrodes; a second substrate facing the first substrate; and a common electrode positioned on the second substrate. The second subpixel electrode may be positioned on the insulating layer, the first subregion of the first subpixel electrode and a third subregion of the second subpixel electrode may overlap each other while interposing the insulating layer therebetween, the second subregion of the first subpixel electrode may include a cross-shaped stem portion having horizontal and vertical portions and a plurality of first branch electrodes that extend from the cross-shaped stem portion, and all of the first branch electrodes formed in either one of the horizontal portion or vertical portion of the cross-shaped stem portion of the second subregion of the first subpixel electrode may have the same length.

The plurality of first branch electrodes formed to have the same length among the plurality of first branch electrodes are formed to have the same length as the first branch electrode that is formed at a center of the cross-shaped stem portion.

All of the first branch electrodes formed in either one of the horizontal portion or vertical portion of the cross-shaped stem portion of the second subregion of the first subpixel electrode may have the same length, and the first branch electrodes formed in other directions, which excludes the direction toward which all of them have the same length, among the first branch electrodes formed in the horizontal and vertical portions, may be formed to have one-half to equal length of the first branch electrode that is formed at the center of the cross-shaped stem portion.

According to the exemplary embodiments of the present invention described above, a structure of the pixel electrode and a structure of the branch electrode formed in the pixel electrode can be changed, thereby preventing the transmittance from decreasing by improving the texture occurrable at the pixels as well as making the side visibility similar to the front visibility.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 6 is a cross-sectional view of the LCD of FIG. 1 taken along the line VI-VI.

FIG. 7 is a cross-sectional view of the LCD of FIG. 1 taken along the line VII-VII.

FIGS. 13 to 15 are pictures showing texture occurrence of the LCD according to the exemplary embodiments of the present invention.

DETAILED DESCRIPTION OF THE EMBODIMENTS

Figure 1:
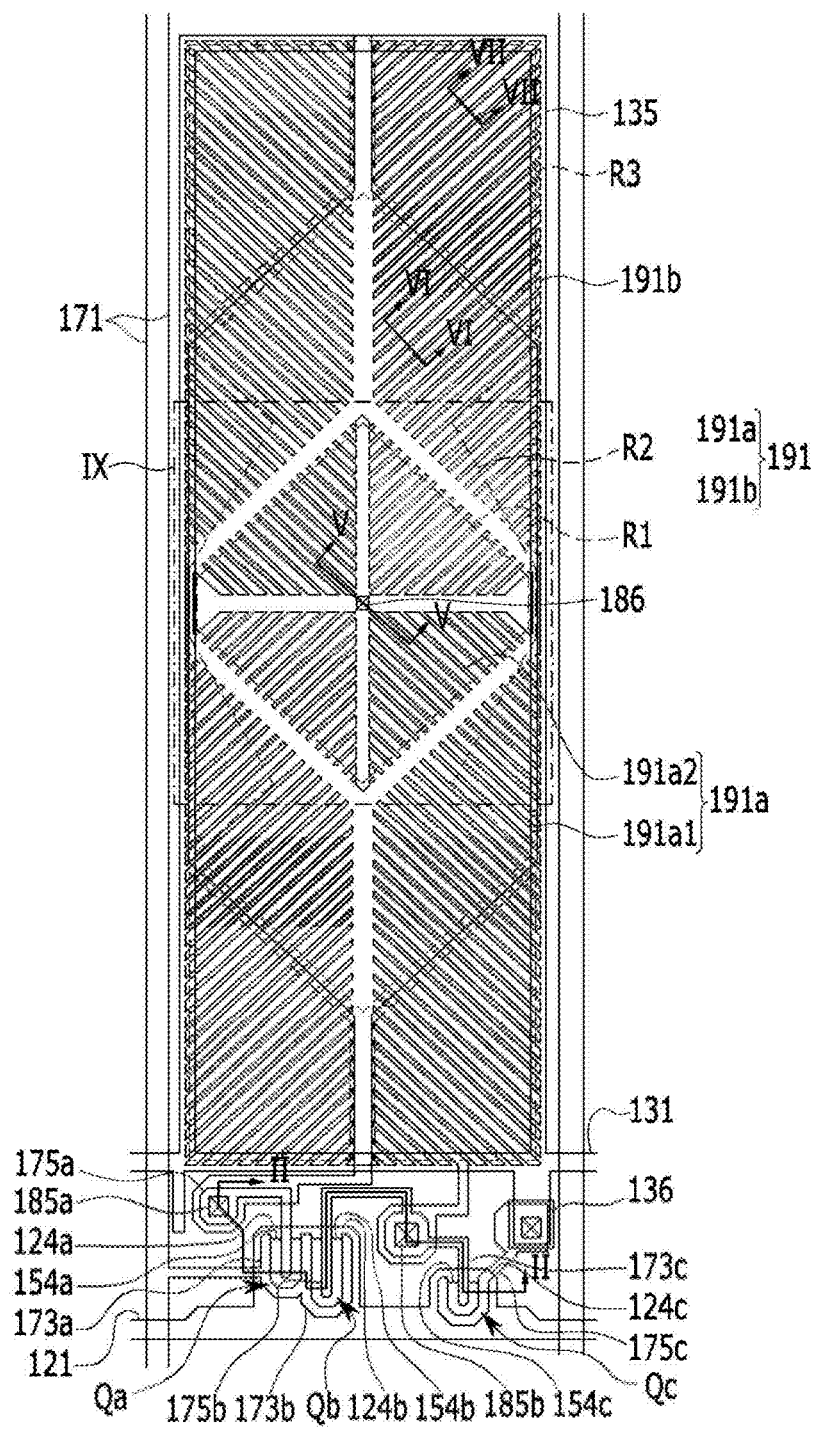
FIG. 1 is a layout view of a liquid crystal display (LCD) according to an exemplary embodiment of the present invention.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

In the drawings, the thickness of layers, films, panels, regions, etc. are exaggerated for clarity.

Like reference numerals designate like elements throughout the specification.

It will be understood that when an element such as a layer, film, region, or substrate is referred to as being "on" another element, it can be directly on the other element or intervening elements may also be present.

In contrast, when an element is referred to as being "directly on" another element, there are no intervening elements present.

A liquid crystal display (LCD) according to an exemplary embodiment of the present invention will now be described in detail with reference to FIGS. 1 to 7.

FIG. 1 is a layout view of a LCD according to an exemplary embodiment of the present invention.

Figure 2:
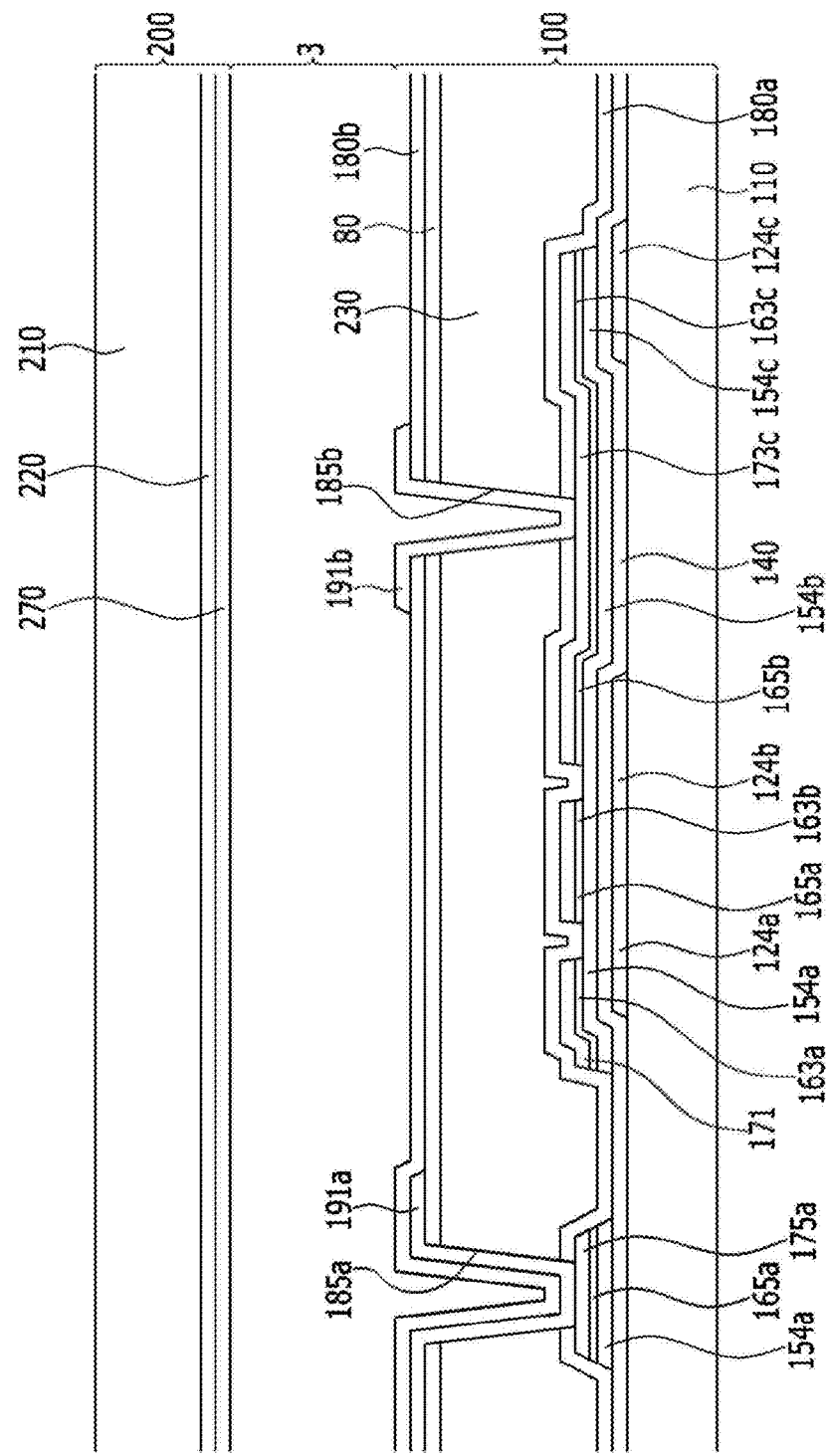
FIG. 2 is a cross-sectional view of the LCD of FIG. 1 taken along the line II-II.

FIG. 2 is a cross-sectional view of the LCD of FIG. 1 taken along the line II-II.

Figure 3:
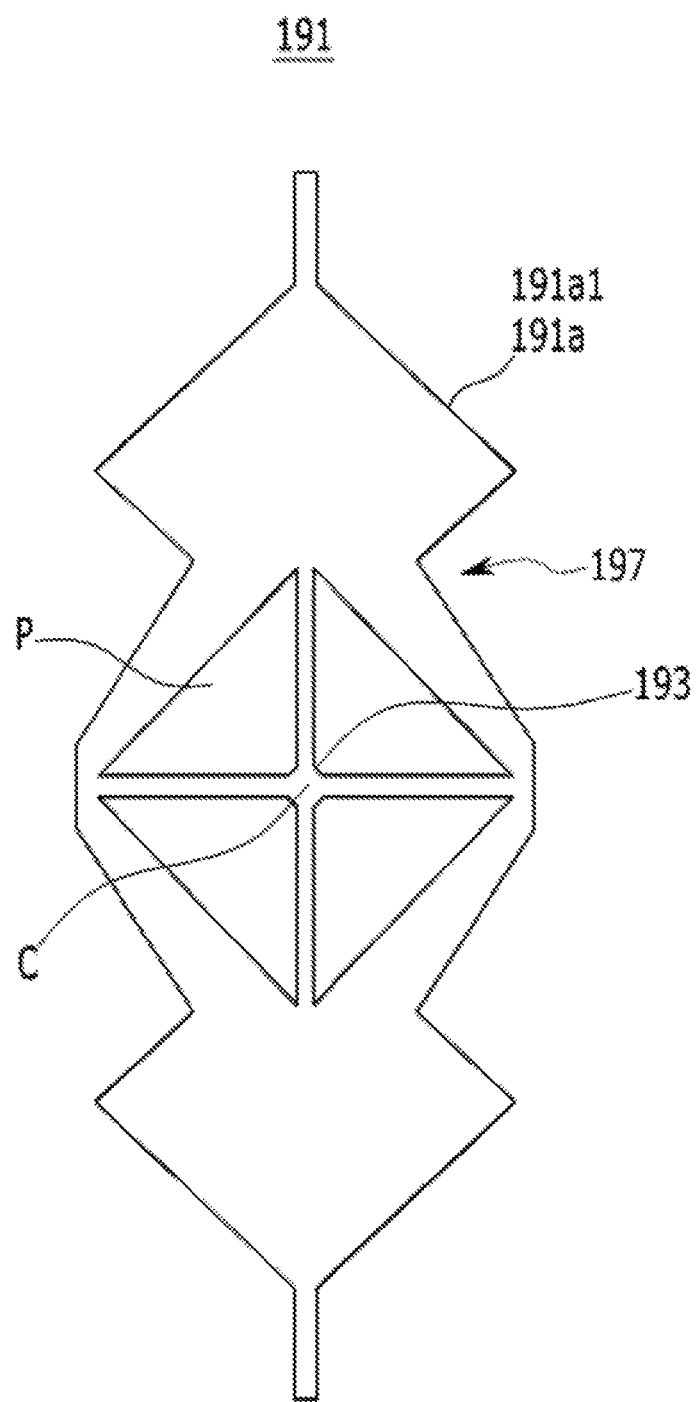
FIG. 3 is a layout view of a first subpixel electrode of the LCD of FIG. 1.

FIG. 3 is a layout view of a first subpixel electrode of the LCD of FIG. 1.

Figure 4:
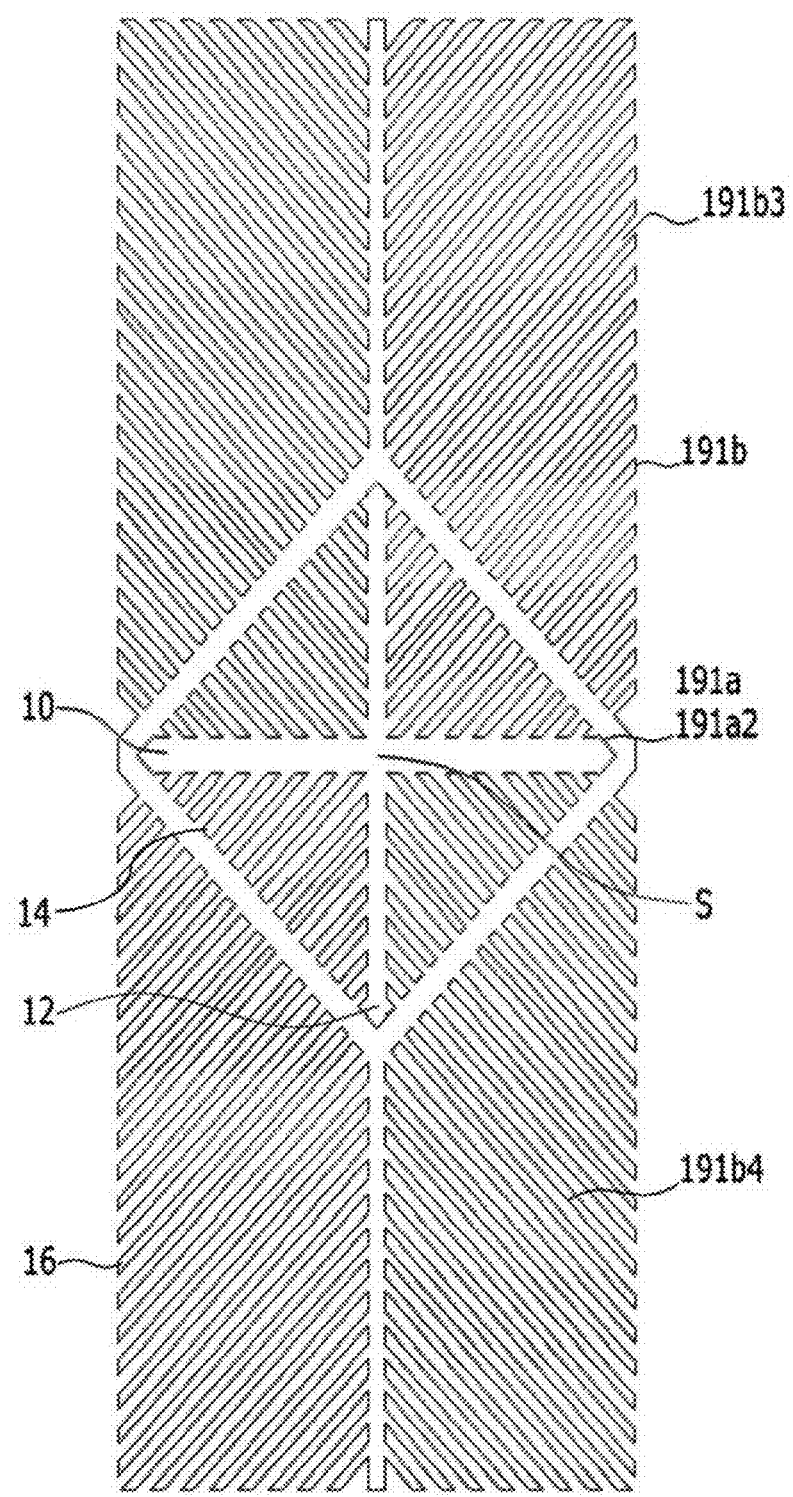
FIG. 4 is a layout view of a part of the first subpixel electrode and a second subpixel electrode of the LCD of FIG. 1.

FIG. 4 is a layout view of a part of the first subpixel electrode and a second subpixel electrode of the LCD of FIG. 1.

Figure 5:
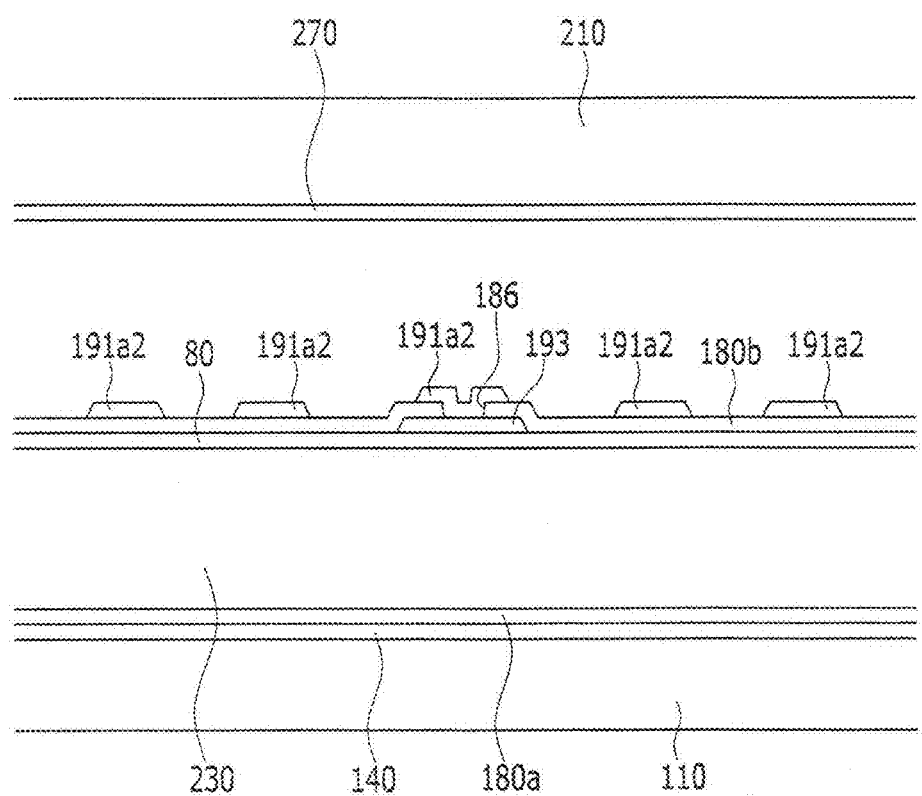
FIG. 5 is a cross-sectional view of the LCD of FIG. 1 taken along the line V-V.

FIG. 5 is a cross-sectional view of the LCD of FIG. 1 taken along the line V-V.

FIG. 6 is a cross-sectional view of the LCD of FIG. 1 taken along the line VI-VI.

FIG. 7 is a cross-sectional view of the LCD of FIG. 1 taken along the line VII-VII.

First, referring to FIGS. 1 and 2, the LCD according to the present exemplary embodiment of the present invention includes lower and upper panels 100 and 200 facing each other, and a liquid crystal layer 3 interposed between these two display panels 100 and 200.

The lower panel 100 will be described first.

A gate line 121, a reference voltage line 131, and a storage electrode 135 are formed on an insulation substrate 110 that is formed of transparent glass or plastic.

The gate line 121 mainly extends in a horizontal direction and transmits a gate signal.

The gate line 121 includes a wide end portion (not shown) for connection with a first gate electrode 124a, a second gate electrode 124b, a third gate electrode 124c, and another layer or an external driving circuit.

The reference voltage line 131 may extend in parallel with the gate line 121 and include an extended portion 136, and the extended portion 136 is coupled to a third drain electrode 175c to be described later.

The reference voltage line 131 includes the storage electrode 135 that encloses a pixel area 191.

A gate insulating layer 140 is formed on the gate line 121, the reference voltage line 131, and the storage electrode 135.

A first semiconductor 154a, a second semiconductor 154b, and a third semiconductor 154c that can be formed of amorphous silicon or crystalline silicon are formed on the gate insulating layer 140.

A plurality of ohmic contacts 163a, 163b, 163c, 165a, and 165b are formed on the first semiconductor 154a, the second semiconductor 154b, and the third semiconductor 154c.

When the semiconductors 154a, 154b, and 154c are oxide semiconductors, the ohmic contacts may be omitted.

A data line 171 including first and second source electrodes 173a and 173b and data conductors including a first drain electrode 175a, a second drain electrode 175b, a third source electrode 173a, and the third drain electrode 175c are formed on the ohmic contacts 163a, 163b, 163c, 165a, and 165b and the gate insulating layer 140.

The second drain electrode 175b is coupled to the third source electrode 173c.

The first gate electrode 124a, the first source electrode 173a, and the first drain electrode 175a form a first thin film transistor (switching element) Qa along with the first semiconductor 154a, and a channel of the thin film transistor Qa is formed at a semiconductor portion 154a between the first source electrode 173a and the first drain electrode 175a.

Similarly, the second gate electrode 124b, the second source electrode 173b, and the second drain electrode 175b form a second thin film transistor (switching element) Qb along with the second semiconductor 154b, and a channel of the thin film transistor Qb is formed at the second semiconductor 154b between the second source electrode 173b and the second drain electrode 175b, while the third gate electrode 124c, the third source electrode 173c, and the third drain electrode 175c form a third thin film transistor (switching element) Qc along with the third semiconductor 154c, and a channel of the thin film transistor Qc is formed at the third semiconductor 154c between the third source electrode 173c and the third drain electrode 175c.

A first passivation layer 180a that can be formed of an inorganic insulator such as a silicon nitride or a silicon oxide is formed on the data line and data conductors (e.g., 171, 173a, 173b, 173c, 175a, 175b, and 175c) and the exposed semiconductors 154a, 154b, and 154c.

A color filter 230 is positioned on the first passivation layer 180a.

A light blocking member (not shown) may be positioned on a region where the color filter 230 is not positioned and a part of the color filter 230.

The light blocking member (not shown) is referred to as a black matrix and prevents light leakage.

A capping layer 80 is positioned on the color filter 230.

The capping layer 80 prevents the color filter 230 from being lifted, suppresses contamination of a liquid crystal layer 3 by an inorganic material such as a solvent inflowed from the color filter, and prevents a defect such as a residual image that can occur when a screen is driven.

A first subregion 191a1 of a first subpixel electrode 191a is formed on the capping layer 80.

Referring to FIG. 3, illustrated in a planar shape are the first subregion 191a1 of first subpixel electrode 191a, wherein first subregion 191a1 has a cross-shaped area comprised of four trapezoidal openings P surrounding a cross-shaped connecting portion C central to the pixel area. 191, the first subregion 191a1 of the first subpixel electrode 191a has a planar shape in which four concave portions 197 are symmetrically formed in the left and right sides of the first subregion 191a1.

In the present exemplary embodiment, the concave portions 197 are illustrated to have a triangular shape for convenience, but they may be variously formed in semicircular, quadrangular, and trapezoidal shapes.

A first extended portion 193 is positioned at the center of the cross-shaped connecting portion C.

In addition, the first extended portion 193 includes a protruding portion that upwardly and downwardly extends from a horizontal center portion of the pixel area 191.

As such, the first subregion 191a1 of the first subpixel electrode 191a is positioned at a part of the pixel area 191.

A second passivation layer 180b is formed on the capping layer 80 and the first subregion 191a1 of the first subpixel electrode 191a.

A second subregion 191a2 of the first subpixel electrode 191a and a second subpixel electrode 191b are formed on the second passivation layer 180b.

Referring to FIG. 4, the second subregion 191a2 of the first subpixel electrode 191a is positioned at a center of a pixel, and has a substantially rhombus shape.

The second subregion 191a2 of the first subpixel electrode 191a includes a cross-shaped stem portion S including a horizontal portion 10 and a vertical portion 12, and a plurality of first branch electrodes 14 extending therefrom.

The first branch electrodes 14 extend in four directions.

The second subpixel electrode 191b includes a third subregion 191b3 overlapping the first subregion 191a1 (not shown) of the first subpixel electrode 191a, and a fourth subregion (191b4) other than the third subregion.

The third subregion 191b3 of the second subpixel electrode 191b and the first subregion 191a1 of the first subpixel electrode 191a overlap each other while interposing an insulating layer therebetween, specifically the second passivation layer 180b therebetween, and includes a plurality of second branch electrodes 16 that extend in the same direction as a plurality of the first branch electrodes 14 of the second subregion 191a2 of the first subpixel electrode 191a.

The fourth subregion (191b4) of the second subpixel electrode 191b includes an outer stem portion that is formed to enclose outer sides of the pixel electrode, and a plurality of third branch electrodes that are coupled to and extend in a direction parallel to the plurality of second branch electrodes extending from the outer stem portion.

The plurality of second branch electrodes 16 and the plurality of third branch electrodes extend in four different directions.

A first contact hole 185a partially exposing the first drain electrode 175a is formed in the first passivation layer 180a and the capping layer 80, and a second contact hole 185b partially exposing the second drain electrode 175b is formed in the first passivation layer 180a, the capping layer 80, and the second passivation layer 180b.

In addition, a third contact hole 186 (FIG. 1) exposing a center portion of the first subregion 191a1 of the first subpixel electrode 191a is formed (FIG. 5) in the second passivation layer 180b.

The first subregion 191a1 of the first subpixel electrode 191a is physically and electrically coupled to the first drain electrode 175a through the first contact hole 185a, and the second subpixel electrode 191b is physically and electrically coupled to the second drain electrode 175b through the second contact hole 185b.

In addition, the second subregion 191a2 of the first subpixel electrode 191a is coupled to the extended portion 193 of the first subregion 191a1 of the first subpixel electrode 191a through the third contact hole 186 that is formed in the second passivation layer 180b.

The first and second subpixel electrodes 191a and 191b are applied with a data voltage through the first drain electrode 175a and the second drain electrode 175b, respectively.

The upper panel 200 will now be described.

A light blocking member 220 and a common electrode 270 are formed on an insulation substrate 210 that is formed of transparent glass or plastic.

However, in an LCD according to another exemplary embodiment of the present invention, the light blocking member 220 may be positioned on the lower panel 100, and in a liquid crystal display according to yet another exemplary embodiment, the color filter may be positioned on the upper panel 200.

Alignment layers (not shown) are formed on inner surfaces of the display panels 100 and 200, and may be vertical alignment layers.

Polarizers (not shown) are provided on outer surfaces of the two display panels 100 and 200, and it is preferable that transmissive axes of the two polarizers are perpendicular to each other and one of the transmissive axes is in parallel with the gate line 121.

However, the polarizers may be disposed only on one of the outer surfaces of the two display panels 100 and 200.

The liquid crystal layer 3 has negative dielectric anisotropy, and liquid crystal molecules of the liquid crystal layer 3 are aligned such that their long axes are perpendicular to the surfaces of the two display panel 100 and 200 while no electric field is present.

Thus, incident light does not pass through crossed polarizers and is blocked while no electric field is present.

At least one of the liquid crystal layer 3 and the alignment layer may include a photo-reactive material, more specifically, a reactive mesogen (RM).

Now, a driving method of a liquid crystal display according to an exemplary embodiment of the present invention will be schematically described.

When a gate-on signal is applied to the gate line 121, the first gate electrode 124a, the second gate electrode 124b, and the third gate electrode 124c, the first switching element (thin film transistor) Qa, the second switching element (thin film transistor) Qb, and the third switching element (thin film transistor) Qc are turned on.

Thus, the data voltage applied to the data line 171 is respectively applied to the first and second subpixel electrodes 191a and 191b through the turned-on first and second switching elements Qa and Qb.

In this case, the first and second subpixel electrodes 191a and 191b are applied with the same voltage.

However, the voltage applied to the second subpixel electrode 191b is divided by the third switching element Qc that is connected in series with the second switching element Qb.

Thus, the voltage applied to the second subpixel electrode 191b is smaller than that applied to the first subpixel electrode 191a.

Referring back to FIG. 1, a single pixel area 191 of the LCD according to the exemplary embodiment of the present invention includes a first region R1 in which the second subregion 191a2 of the first subpixel electrode 191a is positioned, a second region R2 in which the first subregion 191a1 of the first subpixel electrode 191a and the second subpixel electrode 191b partially overlap each other, and a third region R3 in which the second subpixel electrode 191b is partially positioned.

The first region R1, the second region R2, and the third region R3 respectively consist of four subregions.

A size of the second region R2 may be about twice the size of the first region R1, and a size of the third region R3 may be about twice the size of the second region R2.

Now, the first region R1, the second region R2, and the third region R3 included in the single pixel area 191 of the LCD according to the exemplary embodiment of the present invention will be described with reference to FIGS. 5 to 7.

Referring FIG. 5, the first region R1 of one pixel area 191 of the liquid crystal display according to the exemplary embodiment of the present invention is positioned at the lower panel 100, and the second subregion 191a2 of the first subpixel electrode 191a coupled to the extended portion 193 of the first subregion 191a1 of the first subpixel electrode 191a generates an electric field with the common electrode 270 positioned at the upper panel 200.

In this case, the second subregion 191a2 of the first subpixel electrode 191a includes the cross-shaped stem portion S and the plurality of first branch electrodes 14 extending in the four different directions.

The plurality of first branch electrodes 14 may be inclined to form an angle of about 40° to 45° with respect to the gate line 121 (FIG. 1).

Due to a fringe field generated by edges of the plurality of first branch electrodes 14, the liquid crystal molecules of the liquid crystal layer 3 positioned in the first region R1 lie in four different directions.

More specifically, since a horizontal component of the fringe field generated by a plurality of first branch electrodes is nearly in parallel with sides of the plurality of first branch electrodes, the liquid crystal molecules are inclined in a direction parallel to a length direction of the plurality of first branch electrodes.

Referring to FIG. 6, in the second region R2 of the single pixel area 191 of the liquid crystal display according to the exemplary embodiment of the present invention, the third subregion 191b3 of the second subpixel electrode 191b positioned at the lower panel 100 and the first subregion 191a1 of the first subpixel electrode 191a overlap each other.

The liquid crystal molecules of the liquid crystal layer 3 are aligned by an electric field generated between the first subregion 191a1 of the first subpixel electrode 191a positioned between the plurality of second branch electrodes of the third subregion of the second subpixel electrode 191b and the common electrode 270, an electric field generated between the third subregion of the second subpixel electrode 191b and the first subregion 191a1 of the first subpixel electrode 191a, and an electric field generated between the third subregion of the second subpixel electrode 191b and the common electrode 270 of the upper panel 200.

Next, referring to FIG. 7, the third region R3 of the single pixel area 191 of the LCD according to the exemplary embodiment of the present invention generates an electric field along with the fourth subregion (191b4) of the second subpixel electrode 191*b* positioned at the lower panel 100 and the common electrode 270 positioned at the upper panel 200.

In this case, the fourth subregion (191*b*4) of the second subpixel electrode 191*b* includes the plurality of third branch electrodes.

As described above, the second voltage applied to the second subpixel electrode 191*b* is smaller than the first voltage applied to the first subpixel electrode 191*a*.

Thus, intensity of the electric field applied to the liquid crystal layer positioned at the first region R1 is greatest, while intensity of the electric field applied to the liquid crystal layer positioned at the third region R3 is smallest.

Since the electric field of the first subpixel electrode 191*a* positioned under the second subpixel electrode 191*b* affects the second region R2, intensity of the electric field applied to the liquid crystal layer positioned at the second region R2 is smaller than that applied to the liquid crystal layer positioned at the first region R1 and is greater than that applied to the liquid crystal layer positioned at the third region R3.

Referring back to FIG. 3, the first subregion 191*a*1 of the first subpixel electrode 191*a* of the LCD according to the exemplary embodiment of the present invention has the planar shape in which the four concave portions 197 are symmetrically formed at the left and right sides of the cross-shaped connecting portions, and texture of the LCD can be reduced and the transmittance thereof can be increased by including the concave portions 197 that are formed at the first subregion 191*a*1 of the first subpixel electrode 191*a*.

When the concave portions 197 are not formed in the first subregion 191*a*1 of the first subpixel electrode 191*a*, the liquid crystal molecules of the liquid crystal layer 3 may not be arranged in a direction parallel to the second branch electrodes but in a horizontal direction parallel to the gate line 121 at left and right edge portions of the pixel area 191 where the third subregion of the second subpixel electrode 191*b* and the first subregion 191*a*1 of the first subpixel electrode 191*a* do not partially overlap in the second region R2 of the pixel area 191.

When the liquid crystal molecules are arranged in the horizontal direction as such, a section arranged in the horizontal direction may be recognized as the texture.

Thus, the concave portions 197 are formed at the left and right sides of the first subregion 191*a*1 of the first subpixel electrode 191*a* such that the liquid crystal molecules of the liquid crystal layer 3 present at the concave portions 197 and lateral sides of the concave portion 197 are not affected by the first subregion 191*a*1 of the first subpixel electrode 191*a* and allow the liquid crystal molecules to be arranged in the direction parallel to the second branch electrodes at left and right edge portions of the third region of the second subpixel electrode 191*b*, thereby preventing the texture from occurring.

Figure 8A:
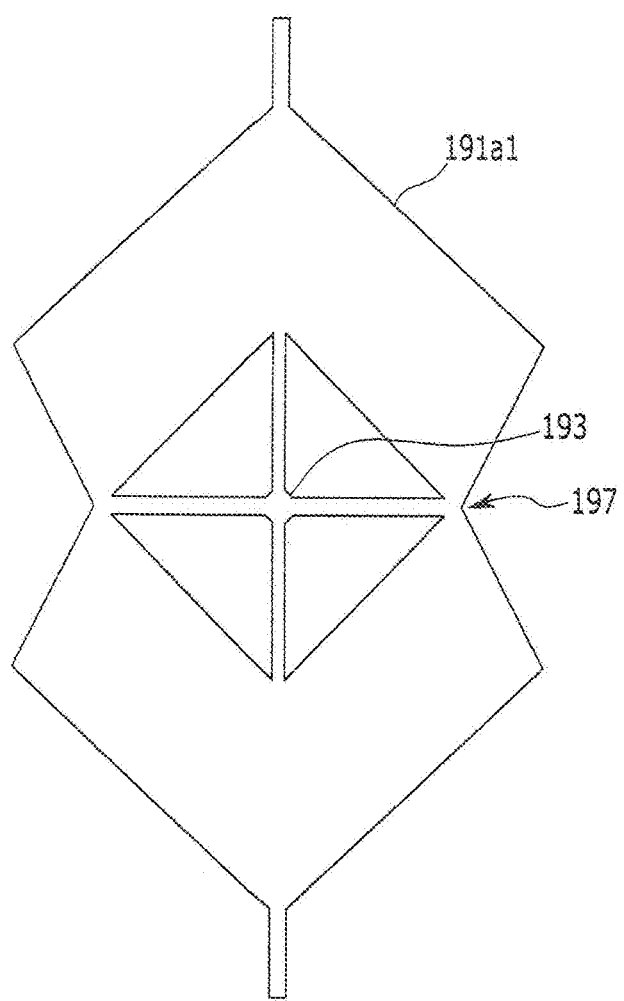
FIGS. 8A and 8B are layout views of a first subpixel electrode of an LCD according to another exemplary embodiment of the present invention.
Figure 8B:
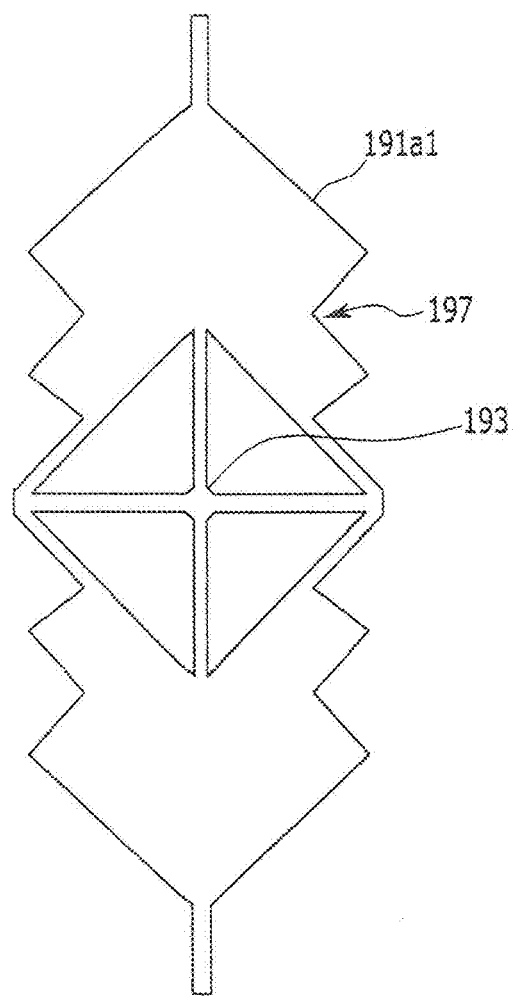

The concave portions 197 of the first subregion 191*a*1 of the first subpixel electrode 191*a* according to the exemplary embodiment of the present invention are illustrated to have a planar shape in which the four concave portions 197 are formed at the left and right sides of the cross-shaped connecting portion, but they are not limited thereto and may be formed to have a planar shape in which the two concave portions 197 are symmetrically formed, as shown in FIG. 8A, at the left and right sides of the cross-shaped connecting portion or a planar shape in which the eight concave portions 197 are symmetrically formed, as shown in FIG. 8B, at the left and right sides of the cross-shaped connecting portion.

In addition, the concave portions 197 formed in the first subregion 191*a*1 of the first subpixel electrode 191*a* according to the exemplary embodiment of the present invention have a triangular shape for convenience, but they are not limited thereto and may be variously modified to have semicircular, quadrangular, trapezoidal, and parallelogramic shapes.

As such, the LCD according to the exemplary embodiment of the present invention differentiates the single pixel area 191 into the first region where the first subpixel electrode to which the relatively high first voltage is applied is positioned, the second region where a part of the first subpixel electrode and a part of the second subpixel electrode to which the relatively low second voltage is applied overlap each other while interposing the insulating layer therebetween, and the third region where the second subpixel electrode to which the relatively low second voltage is applied is positioned.

Thus, the intensities of the electric fields applied to the liquid crystal molecules respectively corresponding to the first region, the second region, and the third region are different, so inclination angles of the liquid crystal molecules are different, thereby making luminance of each region different.

As such, when one pixel area 191 is divided into the three regions of different luminance, the transmittance is prevented from being abruptly changed at the sides even at a low grayscale or high grayscale by smoothly controlling the transmittance according to grayscale, such that the side visibility can be similar to the front visibility and the accurate gray expression is possible even at the low grayscale or high grayscale.

Figure 9:
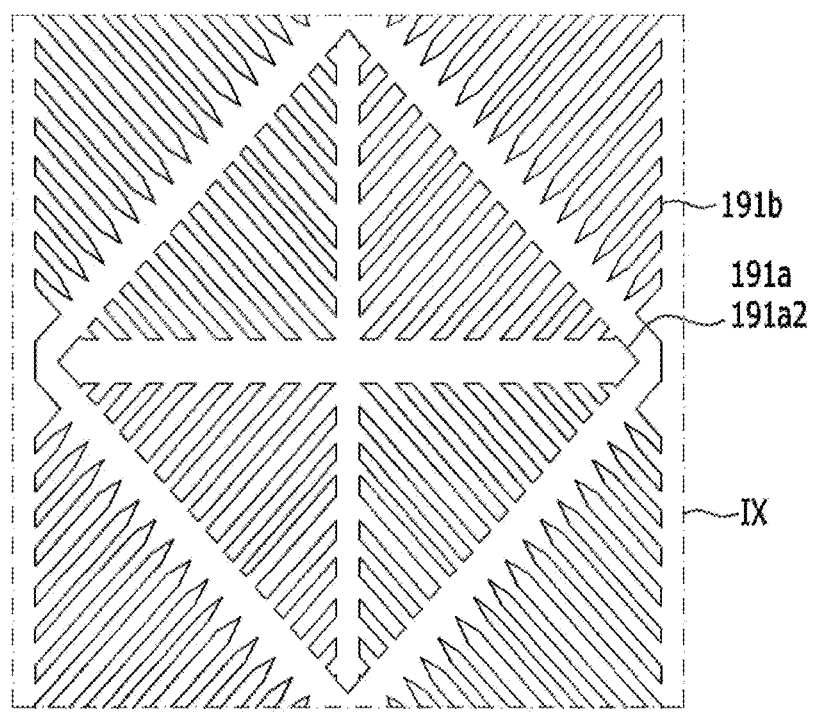
FIG. 9 is a layout view of parts of first and second subpixel electrodes corresponding to an IX region of the LCD of FIG. 1 according to a yet another exemplary embodiment of the present invention.

Now, an LCD according to yet another exemplary embodiment will now be described with reference to FIG. 9. FIG. 9 is a layout view of parts of first and second subpixel electrodes corresponding to an IX region of the LCD of FIG. 1 according to yet another exemplary embodiment of the present invention.

Referring to FIG. 9, since the LCD according to the yet another exemplary embodiment is the same as the liquid crystal display according to the exemplary embodiment described above with reference to FIGS. 1 to 7, except for a second subregion 191*a*2 of a first subpixel electrode 191*a* and shapes of edge portions of second branch electrodes at a border section between the second subpixel electrode 191*b*, a detailed description of the repeated configuration will be omitted.

Similar to the LCD of the exemplary embodiment described above with reference to FIGS. 1 to 7, the LCD according to the yet another exemplary embodiment of the present invention differentiates a single pixel area 191 into a first region R1 where the first subpixel electrode to which the relatively high first voltage is applied is positioned, a second region R2 where a part of the first subpixel electrode and the second subpixel electrode to which the relatively low second voltage is applied overlap each other while interposing the insulating layer therebetween, and a third region R3 where the second subpixel electrode to which the relatively low second voltage is applied is positioned.

A size of the second region R2 may be about twice the size of the first region R1, and a size of the third region R3 may be about twice the size of the second region R2.

Referring to FIG. 9, unlike the LCD of the exemplary embodiment described above with reference to FIGS. 1 to 7, the LCD according to the yet another exemplary embodiment of the present invention is formed such that edge portions of the second branch electrodes of the second subpixel electrode 191b positioned at the border section of the second subregion 191a2 of the first subpixel electrode 191a and the third subregion of the second subpixel electrode 191b have a tapered tip shape.

When the second branch electrodes of the third subregion of the second subpixel electrode 191b are formed, the edge portions of the second branch electrodes directed toward the first region R1 are bluntly formed because their edges cannot be accurately formed.

By the bluntly formed second branch electrodes, the liquid crystal molecules of the liquid crystal layer 3 may not be slantedly arranged in a direction of the first region R1 (hereinafter referred to as a "forward direction") but may be slantedly arranged in a direction of the third region R3 opposite thereto (hereinafter referred to as a "reverse direction").

In this case, a section between the first region R1 and the second region R2 may be recognized as the texture.

Thus, the edge portions of the second branch electrodes of the second subpixel electrode 191b positioned at the border section between the second subregion 191a2 of the first subpixel electrode 191a and the third subregion of the second subpixel electrode 191b are formed to have a tapered tip shape, thereby allowing the liquid crystal molecules of the liquid crystal layer 3 to be slantedly arranged in the forward direction.

However, when the edge portions of the first branch electrodes formed in the second subregion 191a2 of first subpixel electrode 191a are formed to have the tip shape at the border section of the first and second region R1 and R2, the edge portions of the first branch electrodes can more preferably formed to have a blunt shape instead of the tip shape since the liquid crystal molecules of the edge portions of the first region R1 can be slantedly arranged in the reverse direction.

A liquid crystal display according to a further exemplary embodiment will now be described with reference to FIG. 10.

Figure 10:
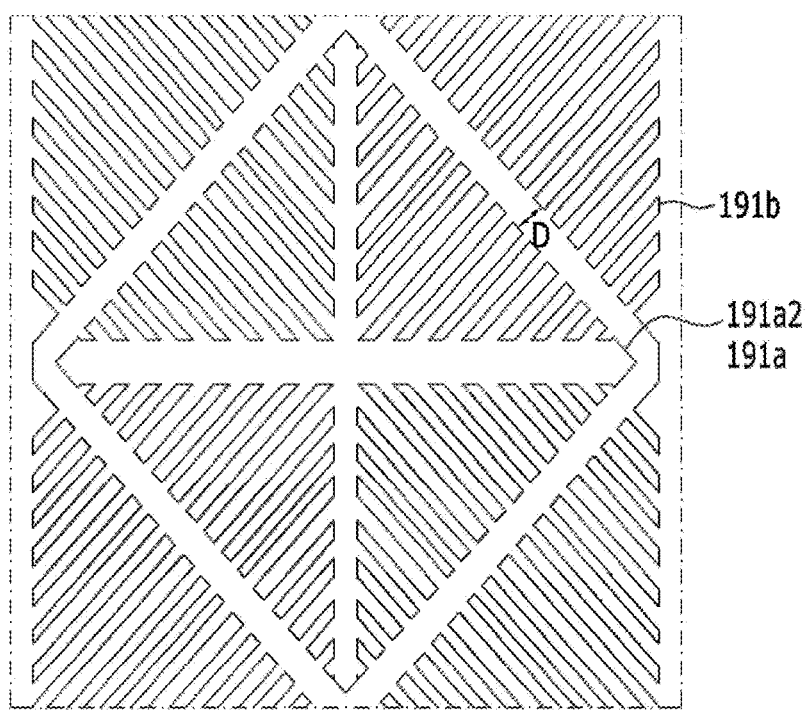
FIG. 10 is a layout view of parts of first and second subpixel electrodes corresponding to an IX region of the LCD of FIG. 1 according to a further exemplary embodiment of the present invention.

FIG. 10 is a layout view of parts of first and second subpixel electrodes corresponding to an IX region of the LCD of FIG. 1 according to a further exemplary embodiment of the present invention.

Referring to FIG. 9, since the LCD according to the further exemplary embodiment is the same as the LCD according to the exemplary embodiment described above with reference to FIGS. 1 to 7, except for a width D of the border section between the second subregion 191a2 of the first subpixel electrode 191a and the second subpixel electrode 191b, a detailed description of the repeated configuration will be omitted.

Referring to FIG. 10, unlike the LCD of the exemplary embodiment described above with reference to FIGS. 1 to 7, the LCD according to the further exemplary embodiment of the present invention is formed such that the width D of the border section between the second subregion 191a2 of the first subpixel electrode 191a and the second subpixel electrode 191b is more narrowly formed.

In the LCD according to the exemplary embodiment illustrated in FIGS. 1 to 7, the width of the border section between the second subregion 191a2 of the first subpixel electrode 191a and the second subpixel electrode 191b is generally formed to exceed 4 μm, while the width of that of the LCD according to the further exemplary embodiment of the present invention illustrated in FIG. 10 may be formed to be 1 μm to 3 μm.

This is because it is highly likely that behaviors of the liquid crystal molecules of the liquid crystal layer 3 between the first region R1 and the second region R2 may become irregular when the width D of the border section between the first region R1 and the second region R2 increases, and that the width of the border section therebetween can be recognized as the texture when the behaviors of the liquid crystal molecules become irregular.

Thus, by further narrowly forming the width D of the border section between the first region R1 and the second region R2, the texture occurable at the width D of the border section therebetween can be prevented in advance.

An LCD according to the further exemplary embodiment of the present invention will now be described with reference to FIGS. 11 and 12.

Figure 11:
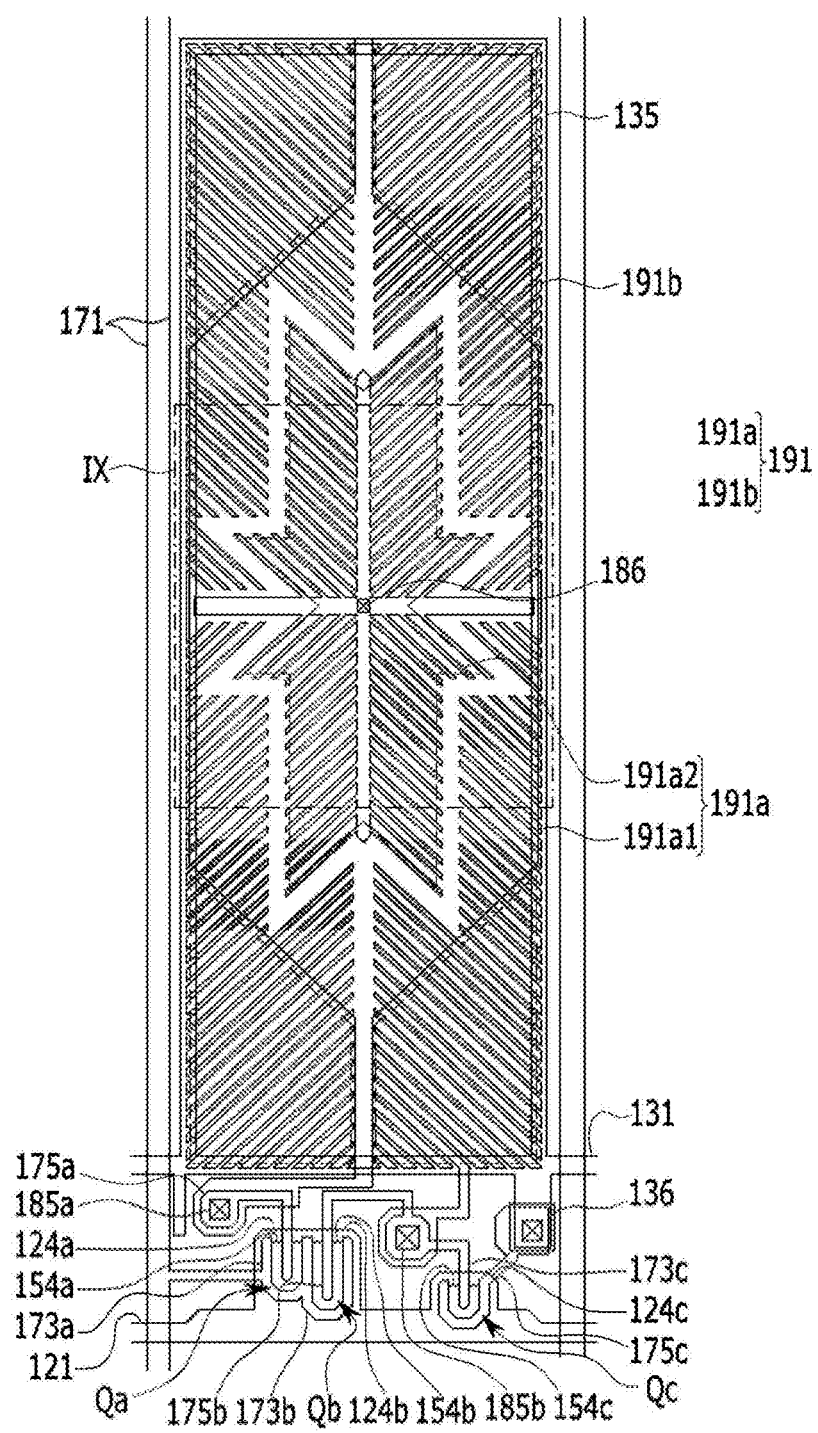
FIG. 11 is a layout view of the LCD according to yet another exemplary embodiment of the present invention.
Figure 12:
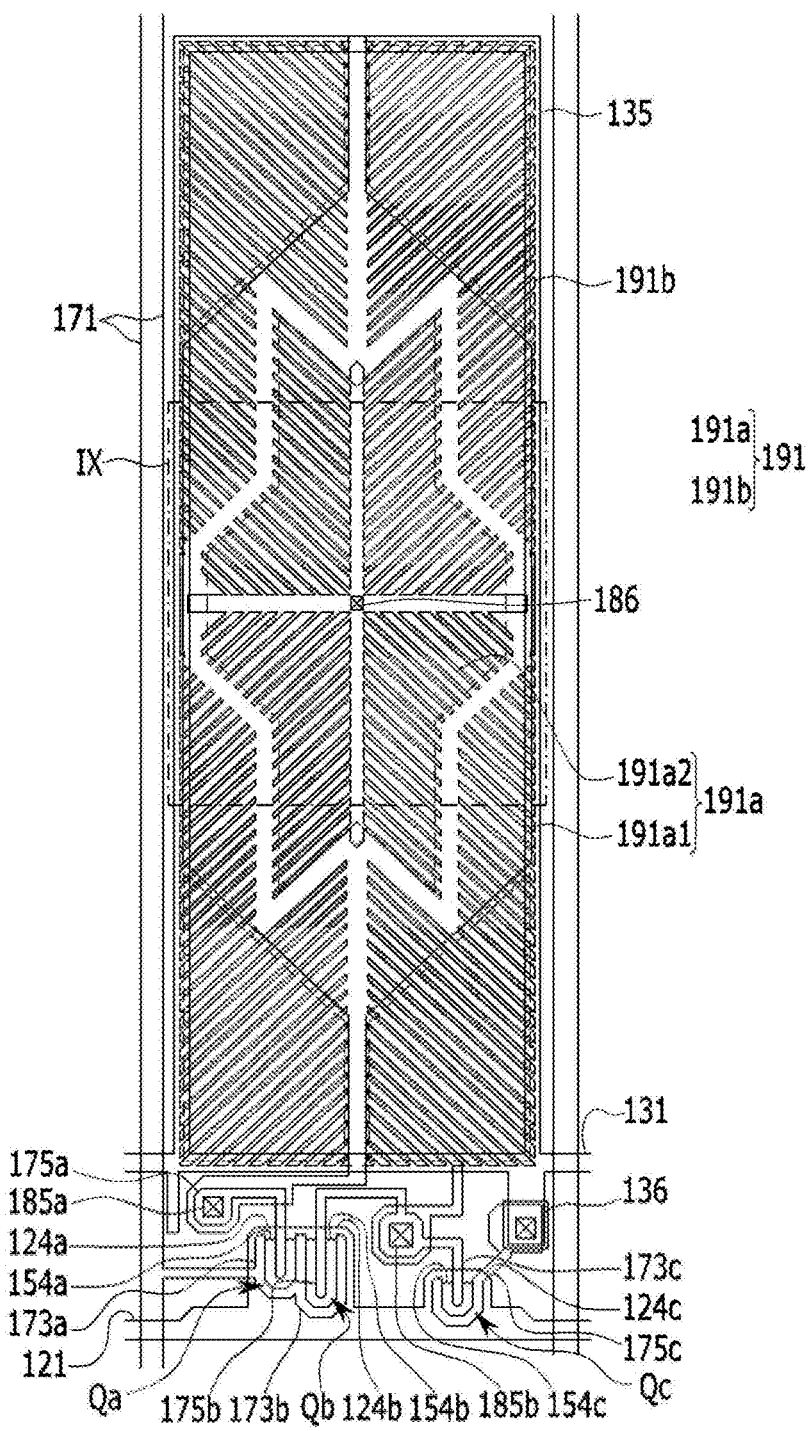
FIG. 12 is a layout view of the LCD according to the further exemplary embodiment of the present invention.

FIGS. 11 and 12 are layout views of the LCD according to the further exemplary embodiment of the present invention.

Referring to FIGS. 11 and 12, since the LCD according to the further exemplary embodiment of the present invention is the same as the LCD according to the exemplary embodiment described above with reference to FIGS. 1 to 7, except for a shape of the second subregion 191a2 of the first subpixel electrode 191a, a detailed description of the repeated configuration will be omitted.

Referring to FIGS. 11 and 12, unlike the LCD of the exemplary embodiment described above with reference to FIGS. 1 to 7, the LCD according to the further exemplary embodiment of the present invention is formed such that all of the first branch electrodes formed in any one of the horizontal portion or vertical portion of the cross-shaped stem portion of the second subregion 191a2 of the first subpixel electrode 191a are formed to have the same length.

That is, all of the first branch electrodes formed in the horizontal and vertical portions of the cross-shaped stem portion may be formed to have the same length, or all of the first branch electrodes formed only in any one direction of the horizontal portion or vertical portion may be formed to have the same length.

FIG. 11 illustrates the second subregion 191a2 of the first subpixel electrode 191a in which all of the first branch electrodes formed in the horizontal and vertical portions of the cross-shaped stem portion are formed to have the same length, and FIG. 12 illustrates the second subregion 191a2 of the first subpixel electrode 191a in which all of the first branch electrodes formed only in the vertical portion of the cross-shaped stem portion are formed to have the same length.

Figure 13:
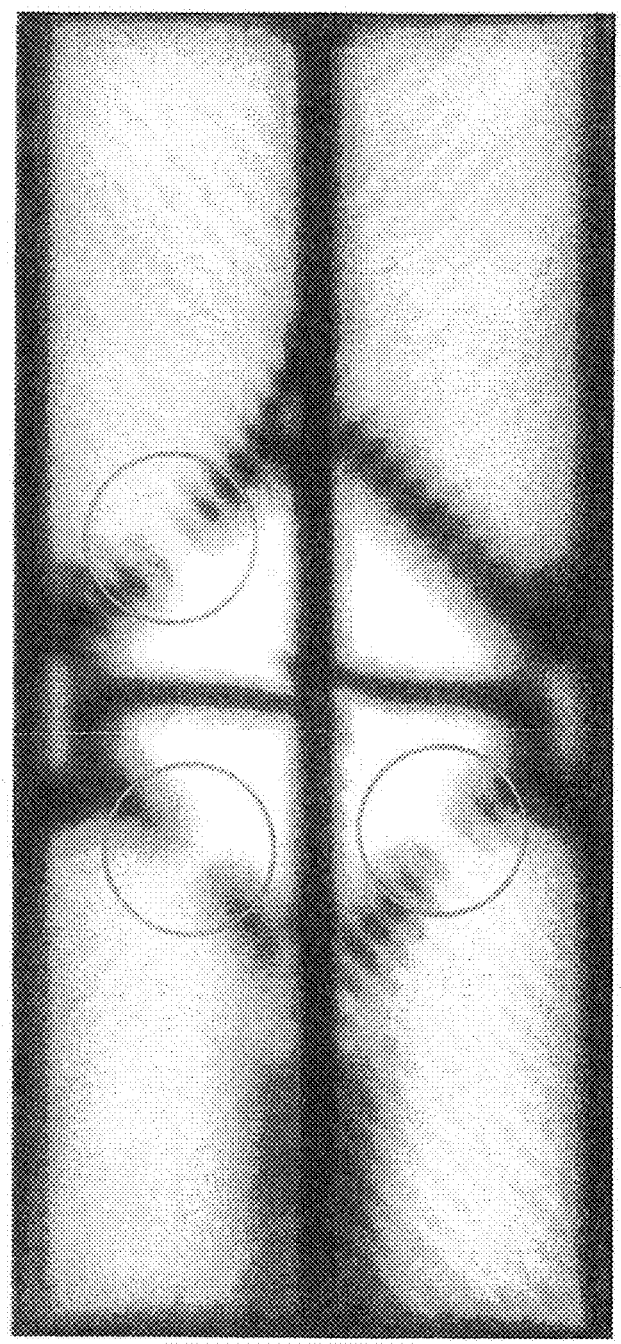

Referring to FIG. 13, in the LCD of the exemplary embodiment described above with reference to FIGS. 1 to 7, it can be seen that the texture does not occur only at the border section of the second subregion 191a2 of the first subpixel electrode 191a and the second subpixel electrode 191b where the first branch electrodes are formed to be long in their lengths, while the texture does occur at the border section where the first branch electrodes are formed to be short in their length, thereby verifying the fact that the texture can be prevented from occurring at the border section of the second subregion 191a2 of the first subpixel electrode 191a and the second subpixel electrode 191b when the first branch electrodes are formed to be long.

Thus, in at least one or more of the horizontal and vertical portions of the cross-shaped stem portion of the second subregion 191a2 of the first subpixel electrode 191a, the first branch electrode is formed to have the same length as the first branch electrode that is formed at the center of the cross-shaped stem portion, thereby preventing the texture from occurring.

In addition, in at least one of the horizontal and vertical portions, the first branch electrode may be formed to have the same length as the longest first branch electrode, and the first electrode may be formed to have a length that exceeds half the length of the longest first branch electrode in the other portions.

Now, an LCD according to an experimental example of the present invention will be described with reference to FIGS. 14 and 15.

FIG. 14 is a picture showing a texture improvement effect of the LCD according to the exemplary embodiment described above with reference to FIGS. 1 to 7, and FIG. 15 is a picture showing a texture improvement effect of the LCD according to the exemplary embodiment described above with reference to FIG. 10.

First, referring to FIG. 14, transmittance and transmittance efficiency are measured for a comparative example in which the concave portions are not formed in the first subregion 191a1 of the first subpixel electrode 191a (a of FIG. 14) and the exemplary embodiment in which the concave portions are formed in the first subregion 191a1 of the first subpixel electrode 191a (b of FIG. 14).

It can be seen that the transmittance efficiency is increased from 81.0% to 83.5% by 2.5%.

In addition, it can be seen that the texture occurring at the left and right edge portions of the pixel area 191 in the comparative example is improved in the exemplary embodiment.

Next, referring to FIG. 15, when a comparative example in which the width D of the border section between the first subregion 191a1 of the first subpixel electrode 191a and the second subpixel electrode 191b is 4 μm (a of FIG. 15) is compared with an exemplary embodiment in which the width D of the border section between the first subregion 191a1 of the first subpixel electrode 191a and the second subpixel electrode 191b is 3 μm (a of FIG. 15), it can be seen that the texture is decreased at the border section therebetween.

According to the exemplary embodiments of the present invention described above, a structure of the pixel electrode and a structure of the branch electrode formed in the pixel electrode can be changed, thereby preventing the transmittance from decreasing by improving the texture occurrable at the pixels as well as making the side visibility similar to the front visibility While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display (LCD) including:
   a first substrate;
   a first subpixel electrode positioned on the first substrate and applied with a first voltage;
   a second subpixel electrode positioned on the first substrate and applied with a second voltage;
   an insulating layer between the first and second subpixel electrodes;
   a second substrate facing the first substrate; and
   a common electrode positioned on the second substrate, wherein
   the first subpixel electrode includes a first subregion under the insulating layer and a second subregion thereon, the first and second subregion are coupled to each other through a contact hole formed in the insulating layer,
   the second subpixel electrode is positioned on the insulating layer,
   the first subregion of the first subpixel electrode and a third subregion of the second subpixel electrode overlap each other while interposing the insulating layer therebetween, and
   the first subregion of the first subpixel electrode is formed with concave portions at edges of left and right lateral sides of a planar shape including a cross-shaped connecting portion at its center and four trapezoids enclosing the cross-shaped connecting portion.

2. The LCD of claim 1, wherein a single pixel area includes:
   a first region where the first subregion of the first subpixel electrode overlaps the second subregion;
   a second region where the first subregion of the first subpixel electrode and the third subregion of the second subpixel electrode overlap each other; and
   a third region where a fourth subregion of the second subpixel electrode is positioned.

3. The LCD of claim 2, wherein
   a difference between the first voltage and a common voltage is greater than that between the second voltage and the common voltage.

4. The LCD of claim 3, wherein
   the second subregion of the first subpixel electrode does not overlap the second subpixel electrode, and
   the second subregion of the first subpixel electrode includes a plurality of first branch electrodes that extend along respective different directions.

5. The LCD of claim 4, wherein
   the second subregion of the first subpixel electrode is positioned at a center of the pixel area in the shape of a rhombus.

6. The LCD of claim 4, wherein
   the second subpixel electrode includes a plurality of second branch electrodes that extend along respective different directions.

7. The LCD of claim 6, wherein
   one or more concave portions are symmetrically formed at respective edges of left and right lateral sides of the first subregion of the first subpixel electrode.

8. The LCD of claim 7, wherein
   the concave portions are formed by one or more selected from triangular, quadrangular, semicircular, parallelogramic, and trapezoidal shapes.

9. The LCD of claim 6, wherein
   a size of the second region is about twice the size of the first region, and a size of the third region is about twice the size of the second region.

10. The LCD of claim 6, wherein
    end portions of the second branch electrode directed toward the first region from the second subpixel electrode are formed to have a tapered tip shape at a border section between the first region and the second region.

11. The LCD of claim 10, wherein
    end portions of the first branch electrode directed toward the second region from the second subregion of the first subpixel electrode are bluntly formed.

12. The LCD of claim 6, wherein the border section between the first region and the second region has a gap that exceeds a predetermined width, and a width of the border section is formed between 1 μm and 3 μm.

* * * * *